(12) United States Patent
Brodmann et al.

(10) Patent No.: US 9,178,245 B2
(45) Date of Patent: Nov. 3, 2015

(54) ENERGY CONVERSION APPARATUS, IN PARTICULAR FUEL CELL STACK OR ELECTROLYZER

(75) Inventors: Michael Brodmann, Huenxe (DE); Martin Greda, Gelsenkirchen (DE); Cristian Mutascu, Gelsenkirchen (DE); Jeffrey Roth, Krefeld (DE)

(73) Assignee: WESTFAELISCHE HOCHSCHULE GELSENKIRCHEN BOCHOLT RECKLINGHAUSEN, Gelsenkirchen (DE)

(*) Notice: Subject to any disclaimer, the term of this patent is extended or adjusted under 35 U.S.C. 154(b) by 417 days.

(21) Appl. No.: 13/512,391

(22) PCT Filed: Dec. 6, 2010

(86) PCT No.: PCT/EP2010/007384
§ 371 (c)(1),
(2), (4) Date: May 29, 2012

(87) PCT Pub. No.: WO2011/069625
PCT Pub. Date: Jun. 16, 2011

(65) Prior Publication Data
US 2012/0237846 A1  Sep. 20, 2012

(30) Foreign Application Priority Data
Dec. 10, 2009 (DE) .......... 10 2009 057 494

(51) Int. Cl.
*H01M 8/02* (2006.01)
*H01M 8/24* (2006.01)
*C25B 9/00* (2006.01)
*C25B 9/18* (2006.01)

(52) U.S. Cl.
CPC ............. *H01M 8/247* (2013.01); *C25B 9/00* (2013.01); *C25B 9/18* (2013.01); *H01M 8/0271* (2013.01); *H01M 8/0284* (2013.01); *H01M 8/248* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 6,258,475 B1 * | 7/2001 | Sugita et al. | 429/470 |
| 6,468,682 B1 * | 10/2002 | Fuglevand et al. | 429/413 |
| 7,862,955 B2 * | 1/2011 | Hartnack et al. | 429/512 |
| 2003/0003338 A1 * | 1/2003 | Yang et al. | 429/27 |
| 2005/0123815 A1 * | 6/2005 | Tsai et al. | 429/27 |
| 2008/0169188 A1 * | 7/2008 | Gil et al. | 204/258 |

FOREIGN PATENT DOCUMENTS

| | | | |
|---|---|---|---|
| DE | 10003528 | * | 8/2001 |
| JP | 2001-143730 | * | 5/2001 |

* cited by examiner

*Primary Examiner* — Jonathan Crepeau
(74) *Attorney, Agent, or Firm* — Andrew Wilford (57) ABSTRACT

The invention relates to an apparatus (1) for converting chemical energy into electrical energy and/or electrical energy into chemical energy with a housing (2, 3, 3a), which is open towards at least one side (6) and in which a pressure chamber (4) is formed, and with at least one electrochemically active cell (5) for energy conversion, which extends from the open side (6) of the housing (2, 3, 3a) into the housing (2, 3, 3a), wherein the open side (6) is closed by a plate (7, 31), which holds and/or supplies power to the cell (5). A sealing element (8, 9) is arranged between the housing (2, 3, 3a) and the plate (7, 31), closes the open side (6) of the housing (2, 3, 3a) in a fluid-tight and/or gas-tight manner so as to form the pressure chamber (4) and is formed at least partially from an elastic material. At least one pocket (10) extending into the pressure chamber (4) is formed in the sealing element (8, 9), wherein the cell (5) is positioned in said pocket and the pocket wall (28) of said pocket is flexible as a result of the elastic material, with the result that the pocket wall (28) bears against the cell (5) in the event of an excess pressure in the pressure chamber (4).

24 Claims, 8 Drawing Sheets

ENERGY CONVERSION APPARATUS, IN PARTICULAR FUEL CELL STACK OR ELECTROLYZER

CROSS REFERENCE TO RELATED APPLICATIONS

This application is the US-national stage of PCT application PCT/EP2010/007384 filed 6 Dec. 2010, published 16 Jun. 2011 as WO2011/069625, and claiming the priority of German patent application 102009057494.8 itself filed 10 Dec. 2009.

FIELD OF THE INVENTION

The present invention relates to an apparatus for converting chemical energy into electrical energy or electrical energy into chemical energy, comprising a housing having at least one open side and in which a pressure chamber is formed, and at least one electrochemically active cell for generating energy that extends from the open side of the housing into the housing, the open side being closed by a plate that holds and/or supplies power to the cell.

BACKGROUND OF THE INVENTION

Such apparatuses are known as fuel-cell or electrolyzer-cell assemblies. In this case, the active cell is a fuel cell that converts chemical energy into electrical energy, or an electrolyzer cell that converts electrical energy into chemical energy. The arrangement of a plurality of plate-shaped cells next to each other is designated as a stack, in particular fuel-cell stack or electrolyzer stack.

In the case of a fuel-cell assembly, fuel and an oxidant are continuously fed to the cell. During the reaction of the two materials, a flow of electrons and thus electrical energy is generated. Conventional individual fuel cells generate a low voltage of about 1.2 V; however, in contrast to this, they generate a comparatively high current density of up to approximately 3 amp/cm$^2$ of active reaction area, where the area information relates to the size of the active areas in a fuel cell. Since in modern membrane fuel cells comprising, for example a polymer electrolyte membrane (PEM) and pole plates resting thereon on both sides, these active areas can be greater than 100 cm$^2$, such an individual fuel cell can supply a current of 300 Ampere and more at a direct current voltage of approximately 1.2 V. The resulting current is calculated as the product of the active area in cm$^2$ and the maximum current density.

Since a direct-current voltage of 1.2 V is too low for many technical applications, very often, a plurality of cells are connected in series in conventional fuel cell assemblies so that the voltages of the cells are additive. Besides the electrical series connection it is also possible to implement a series connection of the supply structure so that fuel and oxidant are fed to a cell at the same time as fuel and oxidant are discharged from the upstream cell. In such an embodiment, particularly compact fuel cells can be produced. Alternatively, a parallel connection of the supply structure can also be employed.

Usually, conventional fuel cells have a flat, planar shape with a substantially rectangular base area so that the individual cells can be stacked parallel and next to each other or on top of each other. This results in a parallelepipedal overall structure whose dimensions depend on the number and the area of the cells. The individual cells are solidly connected to each other in the stack. In order to remove individual cells from such a firm bond in the event of a defect, the electrical connections and the feed lines and discharge lines of the fuel and the oxidant, and the discharge lines of reaction lines have to be detached. Furthermore, the entire fuel-cell stack has to be disassembled, i.e. the pressure plates and the bipolar plates have to be disassembled. In the course of this, the undamaged membranes of the good cells are often destroyed. Accordingly, removing an individual fuel cell from such a stack is only possible with considerable technical effort and is time-consuming.

In contrast, also known are modular fuel-cell stacks, where an individual fuel cell is removably inserted as a module into the fuel cell housing. Each fuel cell forms a closed unit.

For the function of fuel cell it is necessary that the pole plates exert pressure on the polymer electrolyte membrane or on a gas diffusion layer provided between the membrane and the pole plate. The pressure substantially effects the necessary electrical contacting between pole plates and gas diffusion layers so that electrons generated by the reaction in the fuel cell reach the cathode.

Different possibilities are known for applying pressure. For example, this can be done by crowning the pole plates, the plates being formed with a concave curvature. During the assembly of the fuel cell, the edges of the pole plates are connected to each other while being electrically insulated so that they are pulled together. This results in a crowning of the pole plates and the desired contact pressure. Alternatively, the contact pressure can be generated by clamps, in particular spring-steel clamps placed from the outside onto a fuel cell. Furthermore, pressing can also be carried out hydraulically. For this, the pole plates are very thin so that they are highly flexible. Pressure exerted from the outside onto the pole plates then causes a corresponding deformation of the pole plates, the pressure being transferred to the gas diffusion layers. For this, the housing of the fuel cell forms a pressure chamber in which a liquid or a gas, i.e. in general a pressurized medium, is contained. The fuel cells are positioned in the liquid so that during as superatmospheric pressure builds up in the pressure chamber, the liquid transfers the pressure to the pole plates. This constitutes a hydraulic pressing of the cells.

If a defective fuel cell of such a fuel cell is to be replaced, it is necessary to disassemble the cell. The overpressure in the pressure chamber has to be reduced and the medium has to be emptied out. Only then can the defective fuel cell be replaced. For this reason, changing a defect cell of the modular system is also labor-intensive and time-consuming so that repairing the fuel cell ultimately involves higher costs.

OBJECT OF THE INVENTION

It is an object of the present invention to overcome the above-mentioned disadvantages and to make it possible to change a defective cell in a simple and fast manner so that repair costs are reduced.

SUMMARY OF THE INVENTION

The proposal is an apparatus for converting chemical energy into electrical energy or electrical energy into chemical energy, comprising a housing having at least one open side and in which a pressure chamber is formed, and at least one electrochemically active cell for generating energy that extends from the open side of the housing into the housing, the open side being closed by a plate that holds and/or supplies power to the cell, a closure between the housing and the plate closing the open side of the housing in a fluid-tight manner, forming the pressure chamber and being at least partially made of an elastic material, and wherein the closure has at least one pocket that extends into the pressure chamber, in which the cell is positioned, and whose pocket wall is flexible due to the elastic material so that the pocket wall rests against the cell in the case of overpressure in the pressure chamber.

The basic idea of the present invention is to form a chamber that can be pressurized by closing the interior of a housing in an apparatus for converting chemical energy into electrical energy or electrical energy into chemical energy, i.e. in a fuel cell or electrolyzer cell, the interior being closed by a means that has at least one pocket for receiving a fuel cell or electrolyzer cell, the means being flexible at least in the region of the pocket, and the pocket extending into the chamber. This means that upon generating overpressure in the pressure chamber, the pocket wall presses against the cell inserted in the pocket and thus exerts pressure on the pole plates of the cell. Thus, a cell is surrounded by a protective layer, quasi in the form of a skin, namely the pocket wall of the means that separates the housing interior from the cell in a fluid- and pressure-tight manner so that the means forms a closure. The housing of the apparatus and the closure together form a closed chamber in which the overpressure can be built up. The chamber can be filled with fluid that transfers overpressure in the chamber to the outer surfaces of the pocket and presses the pocket inner surfaces against the pole plates of the cell. This results in hydraulic or pneumatic compression of the cell.

If the cell needs to be changed due to a technical defect, the only thing that needs to be done now is to reduce the pressure in the chamber. Discharging the fluid is no longer required. When depressurized, the cell can be removed from the pocket of the closure and, in particular, can be replaced. For this, only minimum expenditure of time is necessary compared to the change of a cell in a conventional fuel cell or electrolyzer unit.

The closure can be retained at least in sections at its edges on the upper edges of the housing, in particular, can be fixed by at least one fasteners. For this, the closure rests with its edge on the upper edges of side walls that face toward the open side of the housing, where it can be adhered, welded or fixed in a different manner, for example by means of a frame as a fastener that can be attached via screw connections to the upper edges and that presses the closure onto the upper edge. In this manner, the housing is closed by means of the closure in a fluid-tight and in particular also pressure-tight manner, the pressure chamber being formed between the housing walls and the closure.

In particular, the apparatus according to the invention can comprise a plurality of active cells, where a pocket is formed in the closure for each of these cells. In this manner, a fuel-cell stack or electrolyzer-cell stack can be produced that allows a cell to be changed in a simple and fast manner.

In the case of planar cells, the pockets can be formed parallel to each other resulting in a stack-shaped arrangement of the cells in the housing.

In an advantageous refinement of the apparatus according to the invention, the housing can have two opposite open sides that are each closed by a respective closure having at least one pocket. In this case, the pockets each extend from one of the open sides into the pressure chamber. The pockets of the opposite closures can be provided parallel and next to each other. In this manner, the apparatus can be considerably shortened in the stacking direction, i.e. in the direction of cells arranged next to each other.

In particular in the case of fuel-cell assemblies and electrolyzer-cell assemblies having a plurality, in particular, a multiplicity of cells, the cells can be distributed over the two open sides of the housing so that some of the cells extend from the one open side into the housing and the rest of the cells extend from the other open side into the housing, or the pockets surrounding the cells extend into the pressure chamber. Thus, a symmetrical structure of the units with regard to the center plane of the housing in the insertion direction can be achieved. It is advantageous here to offset the pockets of a closure with respect to the pockets of the opposite closure each by half the spacing between two adjacent pockets so that in the pressure-side spaces between two pockets of the one closure, the pockets of the other closure are arranged, and in the pressure-side spaces between two pockets of the other pressure element, the pockets of the one pressure element are arranged. This results in a particularly compact construction for a fuel- or electrolyzer-cell assembly.

In a first embodiment, the closure can be made of a substantially dimensionally stable molded part whose shape can be changed by applying a force to it. The molded part can be made, for example, of silicone or polyurethane using by injection molding. When using a molded part, no additional auxiliary means for stabilizing the shape of the closure are required so that the apparatus according to the invention can be assembled in a fast and simple manner.

Preferably, the inner shape of a pocket can be fitted to the outer shape of the cell to be inserted into the pocket. Furthermore, the inner dimensions of a pocket can be fitted to the outer dimensions of the cell to be inserted into the pocket. Thus, inserting the cell into the pocket or, correspondingly, removing it from the pocket when depressurized state is possible without increased expenditure of force. Furthermore, fitting the shapes together ensures that overpressure in the pressure chamber is effectively transferred to the cell because there is no air gap between the pocket wall and the cell.

In an alternative embodiment, the closure can be configured as a textile sheet positioned in a loops in longitudinal cutouts of two opposite side walls of the housing that open toward the open side of the housing. Here, a pocket for receiving a cell is formed. In order that the pocket is perpendicular to the side walls of the housing, the opposite cutouts should be aligned with each other, i.e. should be directly opposite each other.

The textile sheet can have a thickness between 0.5 mm to 1.5 mm, preferably 1 mm, so that it is very flexible and elastic and can be placed with the full surface on the pole plate of a cell when superatmospheric pressure is applied to the pressure chamber.

Since the textile sheet does not maintain a stable shape without auxiliary means, it can be nonpositively fixed in the cutouts by prongs that, in terms of shape and dimensions, correspond to the longitudinal cutouts. The prongs press the textile sheet against the inner sides of the cutouts so that the pressure chamber is closed by the textile sheet in a fluid-tight and pressure-tight manner.

For the use of this constructional configuration in an apparatus having two or more cells, accordingly, two or more opposite cutouts can be provided in the side walls of the housing. The textile sheet is then to be fixed in each of these cutouts by a respective prong. Preferably, the prongs in the cutouts of the same side wall can all be carried on a bar. Bracing the textile sheet in the cutouts on a side wall is therefore carried out simultaneously at all cutouts by a single joining step. This simplifies and shortens assembling the apparatus considerably. The prongs and the bar can be integrally formed.

In one embodiment of the apparatus having a plurality of cells, the pole plates aligned with each other of two adjacent cells can be connected to each other via a mechanically rigid bridge. If this is carried out with all adjacent cells, this results in a series connection of the cells so that the voltages supplied by the cells are additive, or a voltage applied to the series connection of the cells is substantially uniformly distributed among the cells. Here, the bridge connects the anode of the one cell to the other cell.

Preferably, the bridge can be formed integrally with the pole plates. Thus, the bridge together with the pole plates can be made from the same material and in a uniform process step. Alternatively, the bridge can be part of two lamellae that each extend into a pocket and that each bear against a respective pole plate of two adjacent cells. Manufacturing can take place by using a steel or copper sheet or also a copper-coated steel sheet, the two pole plates or the two lamellae and the bridge together being punched out of the sheet and/or molded at the same time in one die and wherein, subsequently, forming the pole plates or the lamellae is carried out using a bending process in such a manner that the pole plates/lamellae are finally provided parallel and opposite each other. Here, one of the pole plates is bent by 180° relative to the other pole plate/lamella. The electrical bridge can be substantially U-shaped. Preferably, the bridge does not extend over the entire length of a pole plate. Rather, the bridge can be only approximately 20-50% of the length of a pole plate and can be provided centrally so that in the inserted state of the pole plates connected to the bridge, supply lines from and to the individual cells can be provided to the right and/or the left of the electrical bridge.

Furthermore, it is of advantage to provide a spacer at the floor of a pocket. Such a spacer prevents damage to the textile sheet due to a sharp edge of a pole plate when the textile sheet positions itself under the overpressure in the pressure chamber on the pole plate of the cell. In this manner, the inner side of a pocket formed by the textile sheet is kept spaced apart from the edge of the pole plate.

In an advantageous refinement of the spacer, the latter can be formed as an elongated molding having two longitudinal grooves for receiving edges of the pole plates of a cell or the edges of the lamellae. Here, the molding can extend over the entire length of a pocket so that at each place of the floor of a pocket, a gap is maintained between the pocket floor and the edges of the pole plates. Furthermore, the spacer can be made from a rubber-elastic material. Inserting the pole plates or lamellae into the spacer effects a dimensional stabilization of the pocket.

BRIEF DESCRIPTION OF THE DRAWING

Further features and advantages of the invention are illustrated below with reference to two specific embodiments and the attached figures. Identical reference numbers designate identical or at least functionally identical parts. In the figures.

SPECIFIC DESCRIPTION OF THE INVENTION

Figure 1:
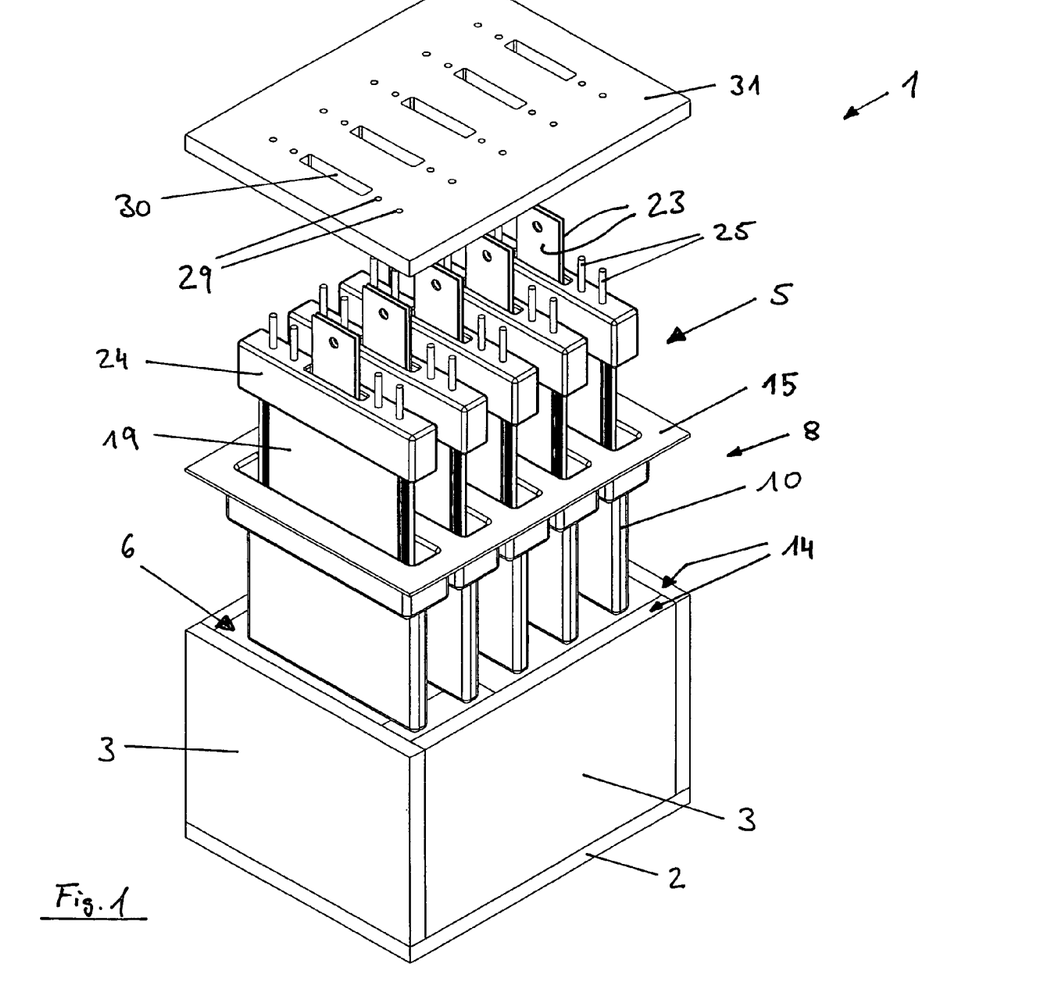
FIG. 1 is an exploded view of a fuel cell according to a first embodiment with a molded part as a closure.

FIG. 1 shows a fuel cell assembly 1 according to a first embodiment of the invention with a housing that comprises a floor plate 2 and four side walls 3. Thus, the housing has five closed sides and one open side 6. This open side 6 is closed in a fluid-tight and pressure-tight manner by a dimensionally stable molded part or closure 8. The molded part 8 has a outer edge collar 15 that rests on upper edges 14 of the side walls 3, in particular, is pressed by unillustrated fasteners onto the upper edges 14 so that the housing with its side walls 3 and the floor and the molded part 8 form a closed chamber 4, see FIG. 2.

The molded part 8 has five pockets that extend into the chamber 4, i.e. in the direction toward the floor 2 of the housing. Each of these pockets 10 is complementary with respect to shape and inner dimensions to a fuel cell 5 that in the assembled state of the fuel cell assembly 1 is inserted in a respective one of the pockets 10. The fuel cells 5 are flat and have on a narrow end a cap 24 that is wider than the rest of the fuel cell. Supply connections 24 for operating fluids and electrical current collectors 23 extend from the cap 24 outward through corresponding holes in a plate 31. In this manner, the plate 31 holds the fuel cells 5 in position.

Figure 2:
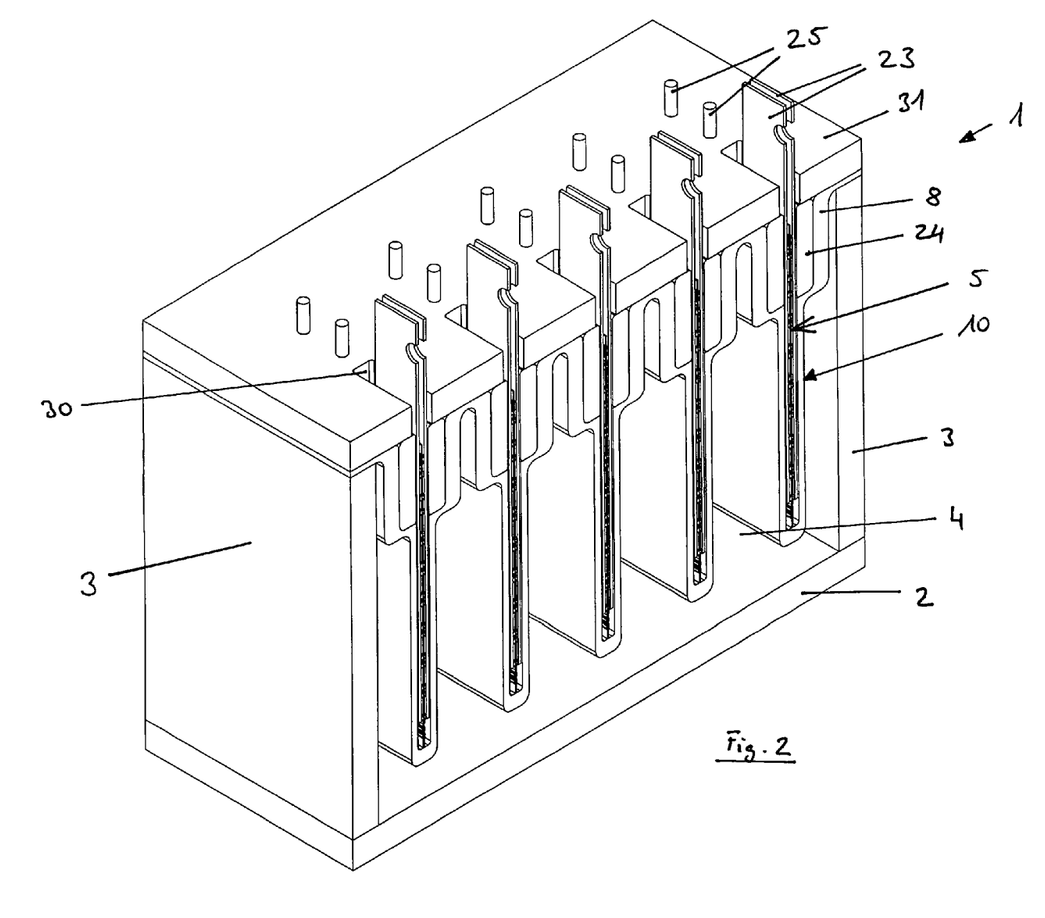
FIG. 2 shows a section of the fuel cell according to FIG. 1 in the assembled state along a center plane in the stacking direction.

FIG. 2 shows the fuel cell assembly 1 when assembled. The molded part 8 is provided here between the housing 2, 3 and the plate 31 that presses the molded part 8 at its outer edge 15 onto the upper edges 14 of the side walls 3. Thus way, the chamber 4 is closed by the floor 2, the side walls 3 and the molded part 8. The pockets 10 formed in the molded part 8 extend into the chamber 4. Each pocket 10 holds a respective fuel cell 5. Supply connections 25 of the cells extend through bores 29 of the plate. The current collectors 23 extend through the holes 30 in the plate and are aligned in a row with the supply connections 25 of the respective cell 5.

Figure 3:
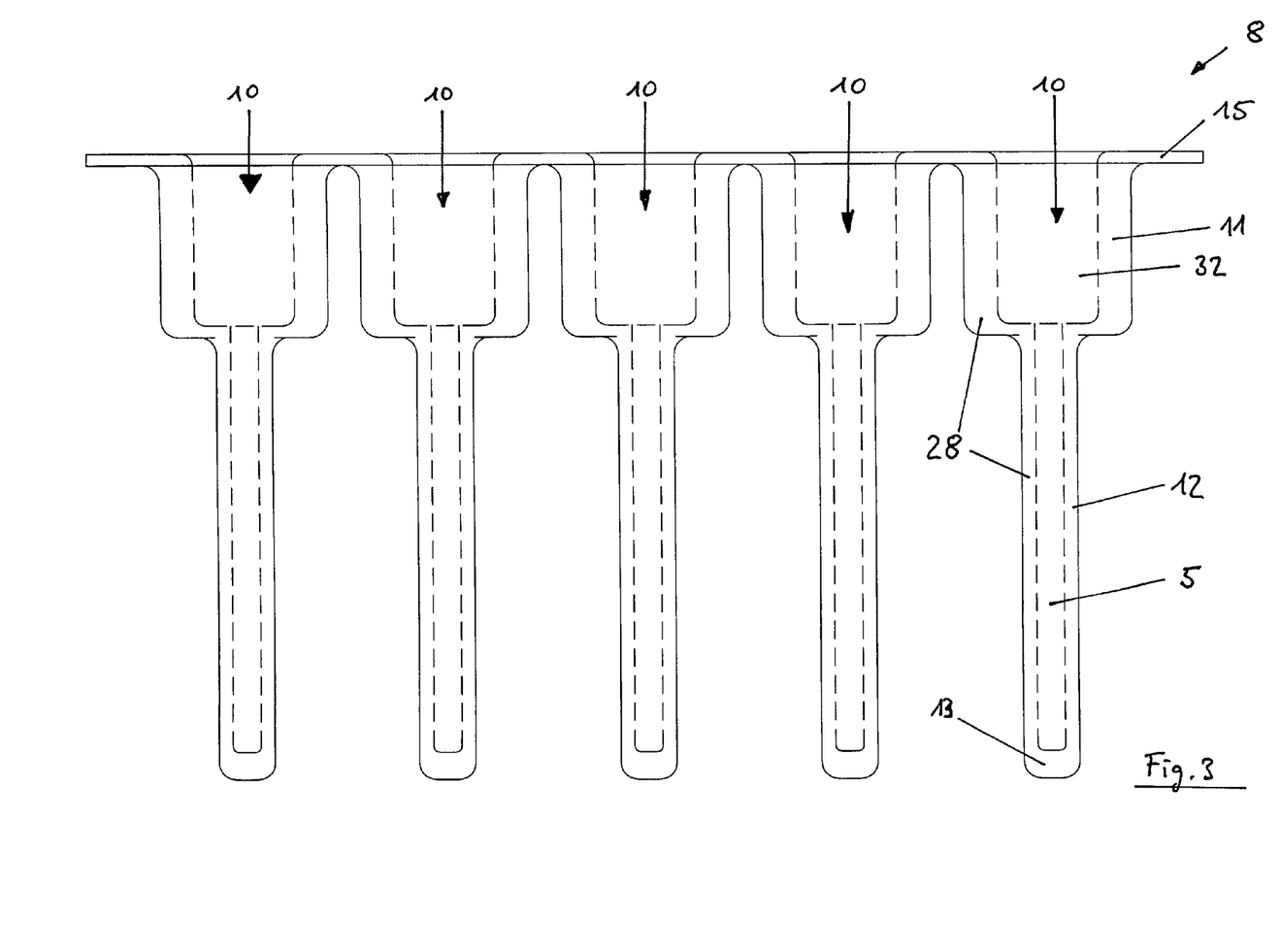
FIG. 3 shows an illustration of the molded part in a side view.

FIG. 3 shows the closure 8 according to the invention in enlarged scale. Five identical pockets 10 each of substantially flat shape are molded on the closure 8, are spaced equidistantly, and extend parallel to each other away from a planar region that formed the edge collar. Each pocket 10 forms a chamber 32 that can receive a respective fuel cell 5 and a wall 28 that surrounds the respective fuel cell and isolates it with respect from the rest of the fuel cell assembly 1. The pocket chamber is indicated with a dashed line. Furthermore, each pocket 10 has a wide first pocket section 11, a narrow lower pocket section 12 and a pocket floor 13. The upper pocket section 11 receives the cap 24 of the respective cell, and the lower pocket section 12 receives the active part of the respective cell 5.

Figure 4:
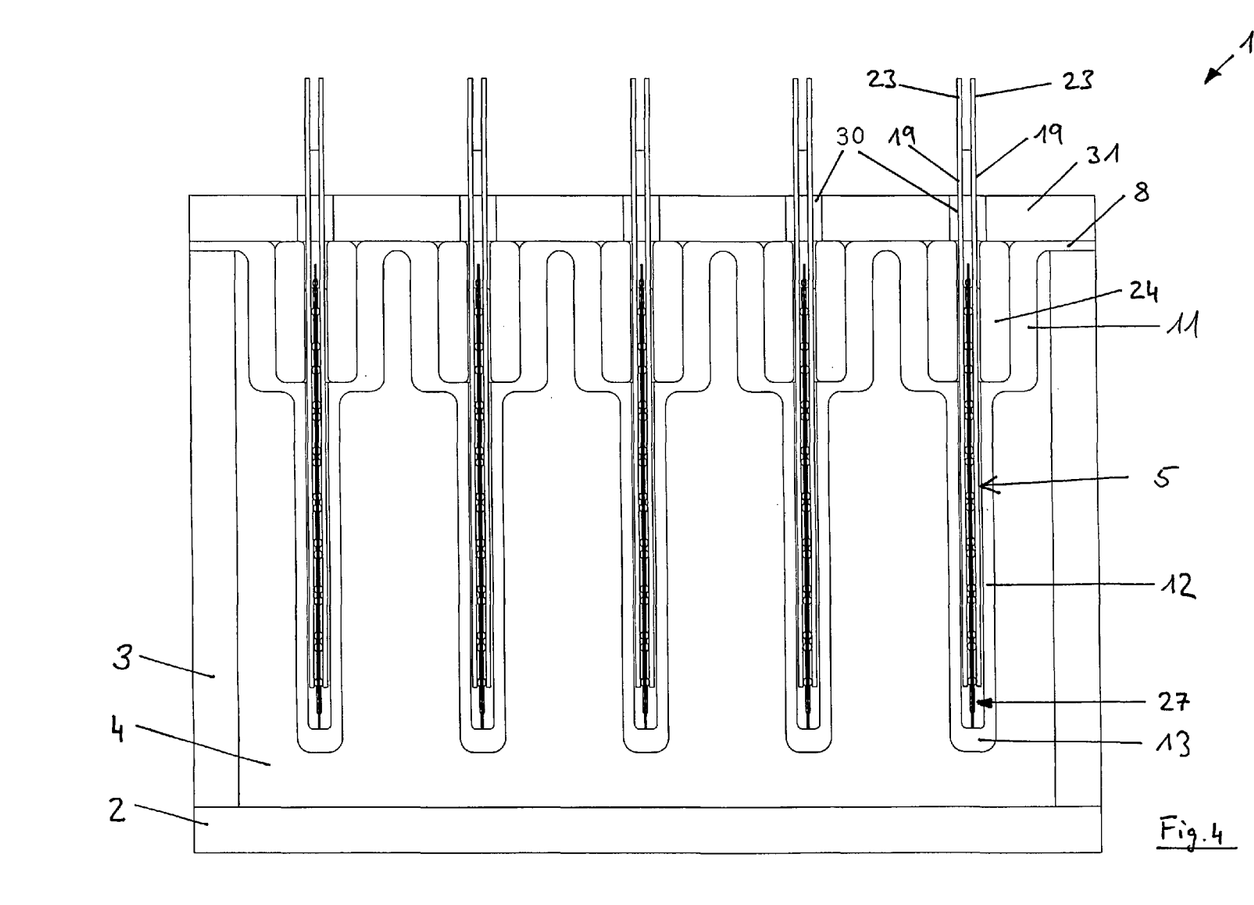
FIG. 4 shows a view on the section plane of the fuel cell according to FIG. 2.

FIG. 4 shows a view on the plane of the fuel cell assembly 1 according to FIG. 2 across the fuel cells 5. The fuel cells 5 each have two pole plates 19 that form the anode and the cathode of the respective cell. Between each pair of pole plates 19 is a respective polymer electrolyte membrane (PEM) 27. Furthermore, an unillustrated gas-diffusion layer can be provided between the membrane 27 and the pole plates 19. Channels in which operating fluids, i.e. fuel and oxidants, are fed are formed between the membrane 27 and the pole plates 19. The pole plates 19 transition into the current collectors 23 that extend through the holes 30 of the plate 31.

The molded part 8 in the embodiment according to the FIGS. 1 to 4 is elastically deformable and is made in one piece from silicone or polyurethane. The wall thickness of the pocket wall 28 and the thickness in the planar region, in particular in the edge region 15, are between one and four millimeters so that the dimensional stability of the molded part is ensured. The shape of the pockets 10 provides additional stiffening of the molded part 8.

FIGS. 5 to 8 show a second embodiment of the invention. The fuel cell assembly 1 differs from that of FIG. 1 in that the closure sealing the housing is formed by a dimensionally unstable, flexible textile sheet 9. The textile sheet 9 has a width that corresponds approximately to the width of the fuel cells 5 plus an overlap for fixing it on the housing 3. The length of the textile sheet 9 depends on the number of fuel cells and in the case of n cells having a length L, is more than 2*L*n. Thus, the length of the textile sheet for 5 cells having a length of about 10 cm can be about 1.2 m.

Figure 5:
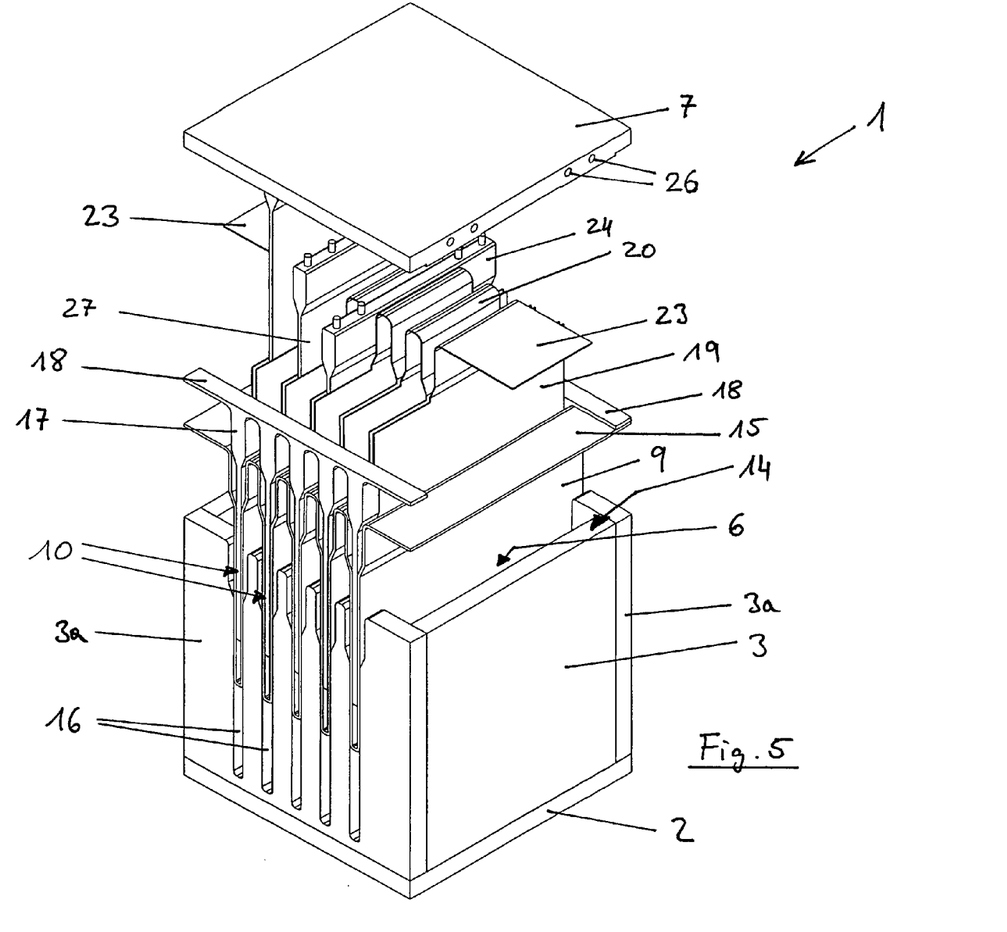
FIG. 5 shows a fuel cell according to a second embodiment with a textile sheet as a closure in an exploded illustration.

Two opposite side walls 3a of the housing have cutouts 16 that are open toward the open side 6 of the housing. The cutouts 16 in the side walls 3a are directly opposite each other. The textile sheet 9 is fitted in loops in the cutouts 16. Extending from the upper edges 14 of the side walls 3, 3a, the textile sheet first extends down along the one inner side of a cutout downward to its lower end, continues from there along the lower edge to the opposite inner side, and then upward and back to the mouth of the cutout. There, the textile sheet 9 exits the cutout 16, is fed across the upper edge of the side wall 3a and runs into the adjacent cutout 16. In this manner, the textile sheet is fed in loop in a serpentine manner through all the cutouts 16.

The textile sheet 9 is retained in the cutouts 16 by prongs 17. The prongs 17 correspond with respect to length and width to the inner dimensions of the cutouts 16 so that the textile sheet 9 is pressed between the prongs 17 and the inner edges of the cutouts 16. The prongs 17 are carried on and unitarily formed with a bar 18. The bar 18 thus has a comb-like shape. The rails 18 each extend past the ends of the respective prongs 17 and, in the inserted state of the prongs 17, press the textile sheet 9 beyond the cutouts 16 on the end side firmly on the upper edges 14 of the side walls 3a.

By laying the textile sheet 9 along the inner sides of two opposite cutouts 16 and adequate fixation by inserting the prongs in the cutouts 16, the textile sheet is spanned from a side wall 3a of the housing to the opposite side wall 3a thereby each forming a pocket 10.

In the embodiment according to FIG. 5 also, there are five pockets that each receive a respective fuel cell 5. As in the preceding embodiment, the fuel cells 5 each have two adjacent pole plates 19 between which a membrane 27 extends from a respective cap 24 into the respective pocket 10. On its narrow side, a cap 24 has supply connections 25 that can be plugged in or are plugged into a supply plate 7. The membrane 27 and thus also the cell 5 itself are held by and supplied with operating fluids from the supply plate 7. For this purpose, the supply plate 7 can comprise a passage structure with inlet and outlet openings through which all cells 5 are supplied or all reaction products are discharged. Such a supply plate 7 is also designated as a backplane.

One current collector 23 extends from each of the pole plates 19 toward the supply plate 7, the pole plates 19 of the fuel cells 5 of the outer ends having on their ends electrical terminals 23 that are bent by 90°. Furthermore, the remaining pole plates 19 are each electrically connected via a respective mechanical bridge 20 to the pole plate of the adjacent cell 5, the anode of one cell being connected to the cathode of the adjacent cell 5. Thus, the cells 5 are connected in series. The pole plates 19 connected to each other and the bridge 20 connecting them are formed in one piece. The bridge 20 is U-shaped and has only about a third of the width of a cell 5. In the transverse direction of the cells 5, the bridges 20 are each centered with regard to the pole plates 19 so that unillustrated supply lines can be provided to the right and to the left of each of the bridges 20.

Figure 6:
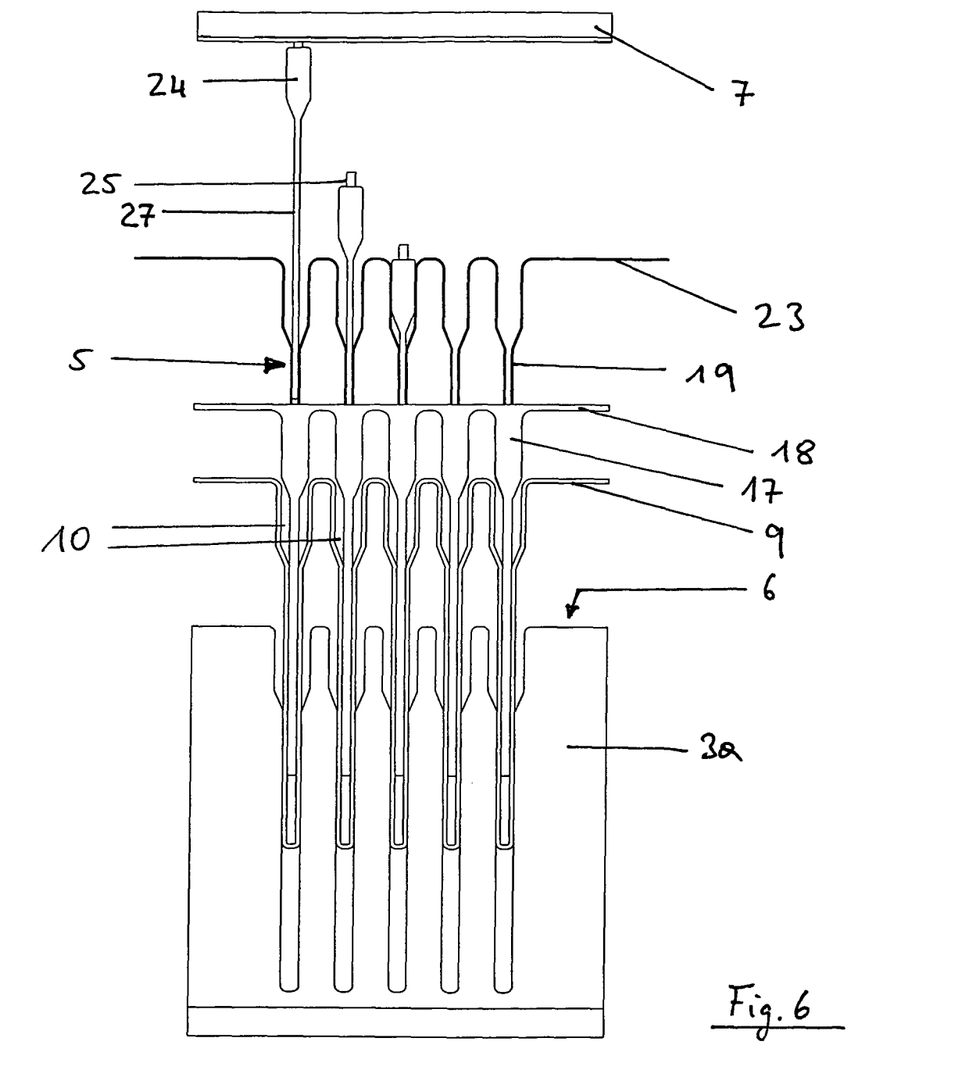
FIG. 6 shows a front view of the fuel cell according to FIG. 5.

FIG. 6 shows the arrangement according to FIG. 5 with an exploded front view on the slotted side walls 3a of the housing.

Figure 7:
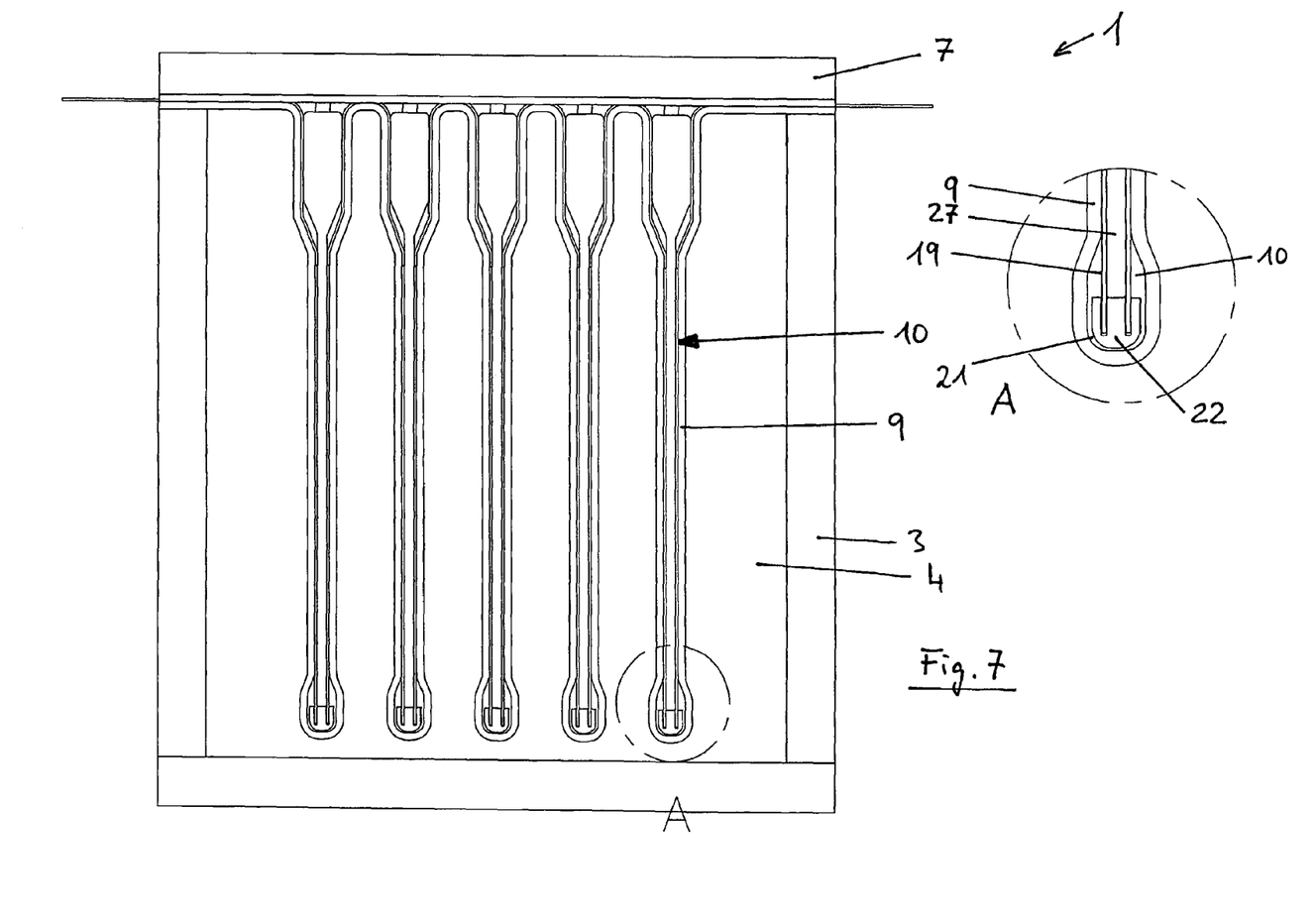
FIG. 7 shows a section of the fuel cell according to FIG. 5 in the assembled state along a center plane in the stacking direction.

FIG. 7 shows the fuel cell assembly 1 according to the FIGS. 5 and 6 in the assembled state. The textile sheet 9 is provided between the supply plate 7 and the side walls 3, 3a of the housing and closes the open side 6 of the housing so that the pressure chamber 4 is formed. FIG. 7 illustrates the highlighted and enlarged detail A. It shows the floor region of a pocket 10, a spacer 22 being fitted to the floor 21 of the pocket 10. The spacer 22 is formed by an elongated molding having two longitudinal grooves. The spacer 22 is downwardly rounded and keeps the edges of the pole plate 19 spaced apart from the textile sheet 9 so that they cannot damage the textile sheet 9 when it pushes on all sides against the pole plates 19.

Figure 8:
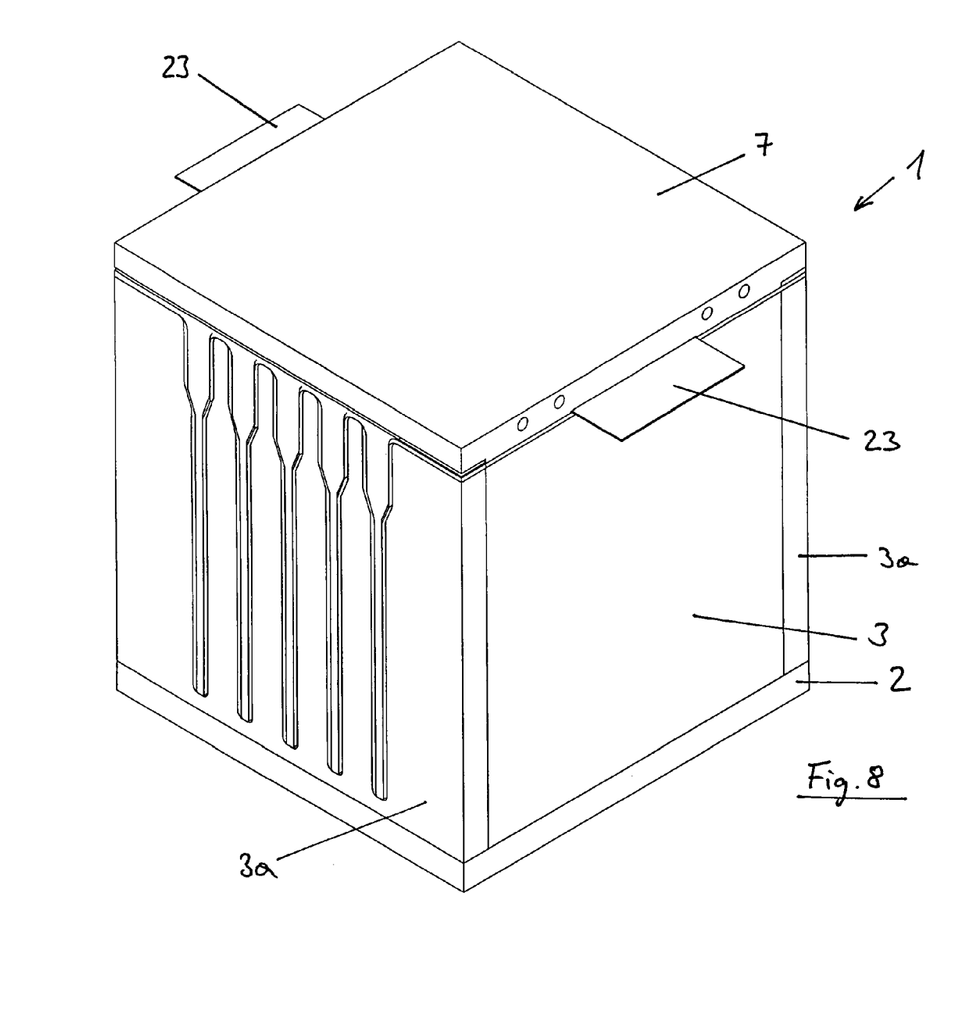
FIG. 8 shows a fuel cell according to FIG. 5 in the assembled state in a perspective view.

FIG. 8 shows the fuel cell according to the FIGS. 5 and 6 in a completely assembled state. The electrical connections 23 project from the parallepipedal housing formed by the floor plate, the side walls 3, 3a and the supply plate 7.

In operation of the fuel cell 1 according to the FIGS. 1 to 8, the chamber 4 is filled with a liquid. When superatmospheric pressure is applied to the chamber 4, the liquid transfers this pressure to the pockets 10 because liquid is incompressible. Thus, pressure is exerted from outside on the pockets 10, as a result of which the inner surfaces of the pockets 10 are pressed against the pole plates 19 that, in turn, are pressed against the membrane 27 or against gas-diffusion plates between the membrane 27 and the pole plates 19.

If a cell 5 has to be replaced due to a defect, the only thing that needs to be done is to reduce the pressure in the chamber 4. When depressurized, the defective cell 5 can be removed easily and quickly from the respective pocket 10 and can be replaced by a new cell 5. This way, time and ultimately costs can be saved.

The invention claimed is:

1. An apparatus for converting chemical energy into electrical energy or electrical energy into chemical energy, the apparatus comprising:
    a housing having at least one open side and forming a pressure chamber;
    means for pressurizing the pressure chamber;
    one or more electrochemically active cells for converting energy and extending from the open side of the housing into the housing;
    a plate closing the open side and holding the one or more cells or supplying electrical or chemical energy to the one or more cells, or both holding and supplying electrical or chemical energy to the one or more cells;
    a closure between the housing and the plate closing the open side of the housing in a fluid- or gas-tight manner to form therein the pressure chamber and at least partially made of an elastic material; and
    one or more respective pockets in the closure, extending into the pressure chamber, and in each of which one of the one or more cells is positioned, the pocket or pockets having a wall that is flexible due to the elastic material so that the respective pocket wall bears against the respective cell in the case of overpressure in the pressure chamber.

2. The apparatus according to claim 1, wherein the closure is retained at least in sections in its edges on upper edges of the housing and is fixed by at least one fastener.

3. The apparatus according to claim 1, wherein there are a plurality of the active cells and a respective pocket is formed in the closure for each cell.

4. The apparatus according to claim 1, wherein the active cells are generally planar and the pockets are parallel to each other.

5. The apparatus according to claim 1, wherein the housing has two of the open sides that are opposite each other and each closed by a respective plate and a respective closure having at least one respective pocket, the pockets each extending from the respective open side into the pressure chamber and being parallel and next to each other.

6. An apparatus for converting chemical energy into electrical energy or electrical energy into chemical energy, the apparatus comprising:
- a housing having at least one open side and forming a pressure chamber;
- at least one electrochemically active cell for converting energy and extending from the open side of the housing into the housing;
- a plate closing the open side and holding the cell or supplying electrical or chemical energy to the cell, or both holding and supplying electrical or chemical energy to the cell;
- a closure between the housing and the plate, made of a molded part that is substantially dimensionally stable closing the open side of the housing in a fluid- or gas-tight manner to form therein the pressure chamber and at least partially made of an elastic material; and
- at least one pocket in the closure, extending into the pressure chamber, and in which the cell is positioned, the pocket having a wall that is flexible due to the elastic material so that the pocket wall bears against the cell in the case of overpressure in the pressure chamber.

7. The apparatus according to claim 1, wherein inner dimensions of each pocket correspond to outer dimensions of the respective cell.

8. A chemical/electrical energy-converting apparatus comprising:
- a housing having an open side and two opposite side walls each having at least one elongated cutout that opens toward the open side of the housing;
- at least one electrochemically active cell for converting energy and extending from the open side of the housing into the housing;
- a plate closing the open side and holding the cell or supplying electrical or chemical energy to the cell or both holding and supplying electrical or chemical energy to the cell;
- a closure between the housing and the plate for securing the plate on the housing in a position closing the open side of the housing in a fluid- or gas-tight manner to form therein the pressure chamber and at least partially made of an elastic textile sheet extending in a loop in the cutouts; and
- at least one pocket formed in the closure by the loop of the textile sheet, extending into the pressure chamber, and in which the cell is positioned, the pocket having a wall that is flexible due to the elastic material so that the pocket wall bears against the cell in the case of overpressure in the pressure chamber.

9. The apparatus according to claim 8, wherein the textile sheet is nonpositively fixed in the cutouts by prongs having shapes that correspond to shapes of the elongated cutouts.

10. The apparatus according to claim 9, wherein the side walls each have two or more of the cutouts, the prongs for the cutouts of each side wall being jointly held on a bar.

11. The apparatus according to claim 3, wherein the cells have pole plates and adjacent pole plates of two adjacent cells are connected to each other via an electrical, mechanically stiff bridge.

12. The apparatus according to claim 11, wherein the bridge is integrally formed with the pole plates.

13. The apparatus according to claim 11, wherein the bridge is part of two lamellae that each extend into a pocket and each bear against a respective pole plate of two adjacent cells.

14. The apparatus for converting chemical energy into electrical energy or electrical energy into chemical energy according to claim 1, further comprising:
- a spacer positioned at a floor of the pocket.

15. The apparatus according to claim 14, wherein the spacer is an elongated molding having two longitudinal grooves receiving edges of the pole plates of the respective cell.

16. The apparatus according to claim 1, wherein the closure is made of silicone or flexible polyurethane.

17. The apparatus according to claim 8, wherein the textile sheet has a thickness between 0.5 mm to 2.5 mm.

18. A chemical/electrical energy-converting apparatus comprising:
- a housing having an open side;
- an elastically flexible closure sealingly engaged over the open side and formed with at least one outwardly open pocket projecting into the housing;
- a rigid cover plate removably engaged over the closure, the closure forming with the housing a substantially closed pressurizable chamber;
- a respective fuel cell fitted to and removable from the pocket and having a pair of pole plates and an electrolyte membrane or gas diffusion layer between the pole plates;
- connectors on the open side of the cell outside the housing for supplying an active reactant fluid to and exhausting a spent reactant fluid from the cell; and
- means for pressurizing the chamber and thereby pressing sides of the pocket against the pole plate and the pole plates against the membrane or layer therebetween.

19. The energy-converting apparatus defined in claim 18, wherein the closure forms a plurality of the pockets and there is a respective fuel cell in each of the pockets, the fuel cells and the pockets being plate-shaped.

20. The energy-converting apparatus defined in claim 1 wherein the housing is rigid and box-shaped.

21. An apparatus for converting chemical energy into electrical energy or electrical energy into chemical energy, the apparatus comprising:
- a housing having two oppositely open sides and forming a pressure chamber;
- at least two respective electrochemically active cells for converting energy and extending from the open side of the housing into the housing;
- a plate closing the open side and carrying the cells or supplying electrical or chemical energy to the cells or both carrying and supplying electrical or chemical energy to the cells;
- respective closures between the housing and the plate closing the open sides of the housing in a fluid- or gas-tight manner to form therein the pressure chamber and each at least partially made of an elastic material; and
- at least one pocket in each closure, extending into the pressure chamber, parallel and next to each other, and in which a respective one of the cells is positioned, the pockets each having a wall that is flexible due to the elastic material so that the pocket walls bear against the respective cell in the case of overpressure in the pressure chamber.

22. An apparatus for converting chemical energy into electrical energy or electrical energy into chemical energy, the apparatus comprising:
- a housing having at least one open side and forming a pressure chamber;
- a plurality of electrochemically active cells for converting energy and extending from the open side of the housing into the housing;
- a plate closing the open side and holding the cells or supplying electrical or chemical energy to the cells or both holding and supplying electrical or chemical energy to the cells;
- a closure between the housing and the plate closing the open side of the housing in a fluid- or gas-tight manner to form therein the pressure chamber and at least partially made of an elastic material; and
- respective pockets in the closure, extending into the pressure chamber, and in each of which a respective one of the cells is positioned, the pockets each having a wall that is flexible due to the elastic material so that the pocket wall bears against the respective cell in the case of overpressure in the pressure chamber.

23. The apparatus according to claim 1, wherein the closure is formed by a textile sheet and that two opposite side walls of the housing each having at least one elongated cutout that opens toward the open side of the housing; the textile sheet extending in a loop in the cutouts so as to form the pocket.

24. The apparatus according to claim 1, wherein the closure is made of a molded part that is substantially dimensionally stable.

\* \* \* \* \*